United States Patent

Wehner et al.

[11] Patent Number: 5,859,100
[45] Date of Patent: Jan. 12, 1999

[54] RIGID PVC STABILISED WITH N,N-DIMETHYL-6-AMINOURACILS

[75] Inventors: Wolfgang Wehner, Ober-Ramstadt; Hans-Helmut Friedrich, Lautertal; Rolf Drewes, Bad Bellingen; Kornelia Malzacher, Lindenfels, all of Germany

[73] Assignee: Ciba Specialty Chemicals Corporation, Tarrytown, N.Y.

[21] Appl. No.: 934,986

[22] Filed: Sep. 22, 1997

[30] Foreign Application Priority Data

Sep. 25, 1996 [CH] Switzerland ............... 2344/96

[51] Int. Cl.⁶ .................................. C08K 5/34
[52] U.S. Cl. .................................. 524/100
[58] Field of Search ........................... 524/100

[56] References Cited

U.S. PATENT DOCUMENTS

| | | | |
|---|---|---|---|
| 3,436,362 | 4/1969 | Hayer et al. | 524/100 |
| 3,696,170 | 10/1972 | Ishida et al. | 260/858 |
| 4,352,903 | 10/1982 | Abeler | 524/100 |
| 4,656,209 | 4/1987 | Wehner et al. | 524/100 |

FOREIGN PATENT DOCUMENTS

| | | |
|---|---|---|
| 1180476 | 1/1985 | Canada . |
| 1336600 | 8/1995 | Canada . |
| 0041479 | 12/1981 | European Pat. Off. . |
| 0065934 | 12/1982 | European Pat. Off. . |
| 0354179 | 2/1990 | European Pat. Off. . |
| 768336 | 10/1996 | European Pat. Off. . |

*Primary Examiner*—Kriellion S. Morgan
*Attorney, Agent, or Firm*—Luther A. R. Hall; Jacob M. Levine

[57] ABSTRACT

Compositions are described, comprising

A) rigid or semi-rigid PVC having a plasticiser content of up to 20%, and

B) at least one compound of formula 1,

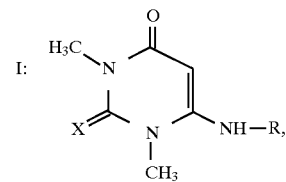

wherein X is O or S, and R is H or phenyl, with the proviso that compounds from the groups of the perchlorate compounds, glycidyl compounds, beta-diketones, beta-keto esters, dihydropyridines, polydihydro-pyridines, polyols, disaccharide alcohols, sterically hindered amines (tetraalkylpiperidine compounds), alkali alumosilicates (zeolites), hydrotalcites, alkali alumocarbonates (dawsonites) are not present.

10 Claims, No Drawings

RIGID PVC STABILISED WITH N,N-DIMETHYL-6-AMINOURACILS

The present invention relates to the—preferably heavy metal-free—stabilisation of rigid or semi-rigid PVC using specific N,N-dimethyl-6-aminouracils defined hereinbelow by formula 1.

DE 1 694 873 teaches to stabilise PVC with specific uracil compounds against thermal and oxidative stress. However, this publication only describes flexible PVC compositions comprising such aminouracils. Other aminouracil and aminothiouracil compounds have also been described as PVC stabilisers (EP 0 065 934, EP 0 354 179, EP 0 041 479). It has now been found that these aminouracil and aminothiouracil compounds are only of very limited suitability for flexible PVC because their presence results in staining or blistering in the stabilised system. Surprisingly, however, PVC having a plasticiser content of up to 20%, i.e. so-called rigid or semi-rigid PVC, can be stabilised very well using the compounds of formula I described hereinafter. Staining constitutes no problem anymore.

Accordingly, this invention relates to compositions comprising

A) rigid or semi-rigid PVC having a plasticiser content of up to 20%, and
B) at least one compound of formula 1,

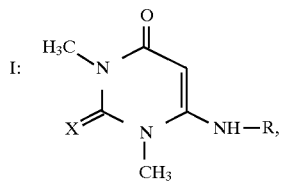

wherein X is O or S, and R is H or phenyl, with the proviso that compounds from the groups of the perchlorate compounds, glycidyl compounds, beta-diketones, beta-keto esters, dihydropyridines, polydihydropyridines, polyols, disaccharide alcohols, sterically hindered amines (tetraalkylpiperidine compounds), alkali alumosilicates (zeolites), hydrotalcites, alkali alumocarbonates (dawsonites) are not present.

Preferred compositions are those, wherein B) is a compound of formula 1, where X=O and, in particular, those compositions, wherein B) is the compound

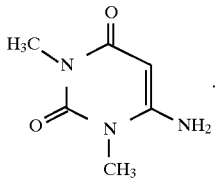

This invention also relates to the use of the compounds of formula 1 for stabilising rigid or semi-rigid PVC, again with the proviso stated above.

The compounds of formula I may be incorporated in the rigid or semi-rigid PVC to be stabilized in an amount of advantageously from 0.01 to 10% by weight, preferably from 0.05 to 5% by weight, and especially from 0.1 to 3% by weight, based on the entire composition.

The compositions of this invention can also contain further customary additives, such as stabilisers, auxiliaries and processing auxiliaries, typically alkali metal compounds and alkaline earth metal compounds, lubricants, plasticisers, pigments, fillers, phosphites, thiophosphites and thiophosphates, mercaptocarboxylates, epoxidised fatty acid esters, antioxidants, UV absorbers and light stabilisers, fluorescent whitening agents, impact modifiers, gelling agents, antistatic agents, biocides, metal deactivators, flame retardant and blowing agents as well as antifogging agents (c.f. "Handbook of PVC-Formulating" by E. J. Wickson, John Wiley & Sons, New York 1993). Illustrative examples of such additives are:

I. Fillers: fillers (HANDBOOK OF PVC FORMULATING E. J. Wickson John Wiley & Sons, Inc., 1993 pp.393–449) and reinforcing agents (TASCHENBUCH der KA'e R. Gächter & H. Muller, Carl Hanser, 1990, pp.549–615) (typically calcium carbonate, dolomite, wollastonite, magnesium oxide, magnesium hydroxide, silicates, China clay, talcum, glass fibres, glass beads, wood flour, mica, metal oxides or metal hydroxides, carbon black, graphite, mineral powder, barite, kaolin and chalk. Chalk is preferred. The fillers can be used in an amount of preferably at least 1 part, typically of 5 to 200, conveniently of 10 to 150 and, more preferably, 1 of 5 to 100, parts by weight, based on 100 parts by weight of PVC.

II. Metal soaps: metal soaps are mainly metal carboxylates of preferably long-chain carboxylic acids. Standard examples are stearates and laurates, and also oleates and salts of short-chain alkylcarboxylic acids. Metal soaps shall also be understood as meaning alkyl-benzoic acids. So-called synergistic mixtures are often used, such as barium/zinc, magnesium/zinc, calcium/zinc or calcium/magnesium/zinc stabilisers. The metal soaps can be used singly or in mixtures. A survey of customary metal soaps may be found in Ullmanns Encyclopedia of Industrial Chemistry, 5th Ed., Vol. A16 (1985) p.361 et seq.. It is convenient to use organic metal soaps from the series of the aliphatic saturated $C_2$–$C_{22}$carboxylates, of the aliphatic unsaturated $C_3$–$C_{22}$carboxylates, of the aliphatic $C_2$–$C_{22}$carboxylates which are substituted by at least one OH group, of the cyclic and bicyclic carboxylate containing 5–22 carbon atoms, of the phenylcarboxylates which are unsubstituted or substituted by at least one OH group and/or by $C_1$–$C_{16}$ alkyl, of the naphthylcarboxylates which are unsubstituted or substituted by at least one OH group and/or by $C_1$–$C_{16}$alkyl, of the phenyl-$C_1$–$C_{16}$ alkylcarboxylates, of the naphthyl-$C_1$–$C_{16}$alkylcarboxylates or of the unsubstituted or $C_1$–$C_{12}$alkyl-substituted phenolates, tallates and resinates.

Typical examples to be mentioned are the zinc, calcium, magnesium or barium salts of the monovalent carboxylic acids, such as acetic acid, propionic acid, butyric acid, valeric acid, hexanoic acid, oenanthic acid, octanoic acid, neodecanoic acid, 2-ethylhexanoic acid, pelargonic acid, decanoic acid, undecanoic acid, dodecanoic acid, tridecanoic acid, myristylic acid, palmitic acid, isostearic acid, stearic acid, 1 2-hydroxystearic acid, behenic acid, benzoic acid, p-tert-butylbenzoic acid, N,N,-dimethylhydroxybenzoic acid, 3,5-di-tert-butyl-4-hydroxybenzoic acid, toluic acid, dimethylbenzoic acid, ethylbenzoic acid, n-propylbenzoic acid, salicylic acid, p-tert-octylsalicylic acid, and sorbic acid; the calcium, magnesium and zinc salts of the monoesters of the divalent carboxylic acids, such as oxalic acid, malonic acid, succinic acid, glutaric acid, adipic acid, fumaric acid, pentane-1,5-dicarboxylic acid, hexane-1,6-dicarboxylic acid, heptane-1, 7-dicarboxylic acid, octane-1,8-dicarboxylic acid, phthalic acid, isophthalic acid, terephthalic acid and hydroxyphthalic acid; and of the di- or triesters of the tri-or tetravalent carboxylic acids, typically hemimellitic acid, trimellitic acid, pyromellitic acid, citric acid.

It is preferred to use calcium carboxylates, magnesium carboxylates and zinc carboxylates of carboxylic acids containing 7 to 18 carbon atoms (metal soaps in the stricter sense), typically benzoates or alkanoates, preferably stearate, oleate, laurate, palmitate, behenate, hydroxystearates, dihydroxystearates or 2-ethylhexanoate. Stearate, oleate and p-tert-butyl-benzoate are particularly preferred. Overbased carboxylates, such as overbased zinc octoate are also preferred.

Where appropriate, a mixture of carboxylates of different structure may also be used.

Preferred compositions are, as described, those comprising an organic zinc compound or/and calcium compound.

In addition to the cited compounds, organic aluminium compounds are also suitable, preferably compounds analogous to the ones mentioned above. Further details about the aluminium compounds which are suitable for use and which are preferred may be found in U.S. Pat. No. 4,060,512 and U.S. Pat. No. 3,243,394.

In addition to the compounds mentioned so far, organic rare earth compounds are also suitable, in particular compounds analogous to those mentioned above. The term rare earth compound will be understood as meaning in particular compounds of the elements cerium, praseodymium, neodymium, samarium, europium, gadolinium, terbium, dysprosium, holmium, erbium, thulium, ytterbium, lutetium, lanthanum and yttrium, mixtures, especially with cerium, being preferred. Other preferred rare earth compounds are to be found in EP-A-0 108 023.

Where appropriate, it is also possible to use a mixture of zinc, alkaline earth, aluminium, lanthanum or lanthanoid compounds of different structure. It is also possible that organic zinc, aluminium, lanthanum or lanthanoid compounds are coated on an alumo salt compound; see also DE-A-4 031 818.

The metal soaps or their mixtures can be used in an amount of typically 0.001 to 10, conveniently of 0.01 to 8, particularly preferably of 0.05 to 5, parts by weight, based on 100 parts by weight of PVC. The same applies to the further metal stabilisers:

III. Further metal stabilisers: The organotin stabilisers merit particular mention here. These are preferably carboxylates, mercaptides and sulfides. U.S. Pat. No. 4 743 640 describes suitable examples.

IV. Alkali metal compounds and alkaline earth metal compounds: These are understood to be, in particular, the carboxylates of the above acids, but also corresponding oxides or hydroxides or carbonates. Their mixtures with organic acids are also suitable. Typical examples are NaOH, KOH, CaO, Ca(OH)$_2$, MgO, Mg(OH)$_2$, CaCO$_3$ and MgCO$_3$ as well as fatty acid sodium salts and fatty acid potassium salts. In the case of alkaline earth metal carboxylates and zinc carboxylates it is also possible to use their adducts with MO or M(OH)$_2$ (M=Ca, Mg, Sr or Zn), so-called overbased compounds. It is preferred to use alkali metal carboxylates, alkaline earth metal carboxylates and/or aluminium carboxylates in addition to the novel stabiliser combination.

V. Lubricants: Suitable lubricants are for example: montan wax, fatty acid ester, PE waxes, amide waxes, chloroparaffins, glycerol ester or alkaline earth metal soaps. Lubricants which may be used are also described in "Kunststoffadditive", R. Gächter/H. Müller, Carl Hanser Verlag, 3rd Ed., 1989, pages 478–488. Also to be mentioned are fatty ketones (such as described in DE 4 204 887) and lubricants based on silicone (as described in EP 225 261), or combinations thereof, as indicated in EP 259 783.

VI. Plasticisers: Suitable organic plasticisers are, for example, those of the following groups:

A) Phthalates: Typical examples of such plasticisers are dimethyl phthalate, diethyl phthalate, dibutyl phthalate, dihexyl phthalate, di-2-ethylhexyl phthalate, di-n-octyl phthalate, di-iso-octyl phthalate, di-iso-nonyl phthalate, di-iso-decyl phthalate, di-iso-tridecyl phthalate, dicyclohexyl phthalate, di-methylcyclohexyl phthalate, dimethyl glycol phthalate, dibutyl glycol phthalate, benzylbutyl phthalate and diphenyl phthalate as well as mixtures of phthalates, such as $C_7$–$C_9$- and $C_9$–$C_{11}$alkylphthalates of predominantly linear alcohols, $C_6$–$C_{10}$-n-alkylphthalates and $C_8$–$C_{10}$-n-alkylphthalates. Of these, dibutyl phthalate, dihexyl phthalate, di-2-ethylhexyl phthalate, di-n-octyl phthalate, di-iso-octyl phthalate, di-iso-nonyl phthalate, di-iso-decyl phthalate, di-iso-tridecyl phthalate and benzylbutyl phthalate are preferred, as well as the cited mixtures of alkyl phthalates. The use of di-2-ethylhexyl phthalate, di-iso-nonyl phthalate and di-iso-decylphthalate is particularly preferred, which compounds are also known by the conventional abbreviations DOP (dioctyl phthalate, di-2-ethylhexyl phthalate), DINP (diisononyl phthalate), DIDP (diisodecyl phthalate).

B) Esters of aliphatic dicarboxylic acid, preferably esters of adipic acid, azelaic acid and sebacic acid: Typical examples of such plasticisers are di-2-ethylhexyl adipate, di-isooctyl adipate (mixture), di-iso-nonyl adipate (mixture), di-iso-decyl adipate (mixture), benzyl butyl adipate, benzyl octyl adipate, di-2-ethylhexyl azelate, di-2-ethylhexyl sebacate and di-iso-decyl sebacate (mixture). Di-2-ethylhexyl adipate and di-iso-octyl adipate are preferred.

C) Trimellitates, typically tri-2-ethylhexyltrimellitate, tri-iso-decyl trimellitate (mixture), tri-iso-tridecyl trimellitate, tri-iso-octyl trimellitate (mixture) and also tri-$C_6$–$C_8$alkyl, tri-$C_6$–$C_1$₀alkyl trimellitate, tri-$C_7$–$C_9$alkyl trimellitate and tri-$C_9$–$C_{11}$alkyltrimellitate. The latter trimellitates are obtained by esterifying trimellitic acid with the corresponding alkanol mixtures. Preferred trimellitates are tri-2-ethylhexyl trimellitate and the cited trimellitate of alkanol mixtures. Conventional abbreviations are TOTM (trioctyl trimellitate, tri-2-ethylhexyl trimellitate), TIDTM (triisodecyl trimellitate) and TITDTM (triisotridecyl trimellitate).

D) Epoxide plasticisers: These include mainly the epoxidised unsaturated fatty acids, such as epoxidised soy bean oil.

E) Polymeric plasticisers: A definition of these plasticisers and examples thereof are to be found in "Kunststoffadditive", R. Gächter H. Müller, Carl Hanser Verlag, 3rd Ed., 1989, chapter 5.9.6, pages 412–415, as well as in "PVC Technology", W. V. Titow, 4th Ed., Elsevier Publ., 1984, pages 165–170. The most usual starting materials for the preparation of the polyester plasticisers are: dicarboxylic acids, typically adipic acid, phthalic acid, azelaic acid and sebacic acid; diols, such as 1,2-propanediol, 1,3-butanediol, 1,4-butanediol, 1,6-hexanediol, neopentyl glycol and diethylene glycol.

F) Phosphoric acid ester: A definition of these esters is given in the above-mentioned "Taschenbuch der Kunststoffadditive", chapter 5.9.5, p. 408–412. Illustrative examples of such phosphoates are tributyl phosphate, tri-2-ethylbutyl phosphate, tri-2-ethylhexyl phosphate, trichloroethyl phosphate, 2-ethylhexyl-diphenyl phosphate, cresyldiphenyl phosphate, triphenyl phosphate, tricresyl phosphate and trixylenyl phosphate. Tri-2-ethylhexyl phosphate and ®Reofos 50 and 95 (Ciba-Geigy) are preferred.

G) Chlorinated hydrocarbons (paraffins)

H) Hydrocarbons

I) Monoesters, typically butyl oleate, phenoxyethyl oleate, tetrahydrofurfuryl oleate and alkylsulfonate.

J) Glycol esters, e.g. diglycol benzoate.

Definitions and examples of plasticisers of groups G) to J) are to be found in the following handbooks:

"Kunststoffadditive", R. Gächter/H. Muller, Carl Hanser Verlag, 3rd Ed., 1989, chapter 5.9.14.2, p.422–425, (group G)), and chapter 5.9.14.1, p. 422, (group H). "PVC Technology", W. V. Titow, 4th Ed., Elsevier Publishers, 1984, chapter 6.10.2, pages 171–173, (group G), chapter 6.10.5, page 174, (group H), chapter 6.10.3, page 173, (group 1) and chapter 6.10.4, pages 173–174 (group J).

It is also possible to use mixtures of different plasticisers.

The plasticisers can be used in an amount of typically 5 to 20, conveniently of 10 to 20, parts by weight, based on 100 parts by weight of PVC. The rigid or semi-rigid PVC preferably contains up to 10%, particularly preferably up to 5% of plasticiser, or none at all.

VII. Pigments: Suitable substances are known to the skilled person. Typical examples of inorganic pigments are $TiO_2$, $BaSO_4$, carbon black, $Fe_2O_3$, $Sb_2O_3$, $(Ti,Ba,Sb)O_2$, $Cr_2O_3$, spinels, such as cobalt blue and cobalt green, Cd(S, Se), ultramarine blue. Organic pigments are, for example, azo pigments, phthalocyanine pigments, quinacridone pigment, perylene pigments, diketopyrrolopyrrole pigments and anthraquinone pigments. $TiO_2$ in micronised form is also preferred. A definition and further descriptions are to be found in "Handbook of PVC Formulating", E J. Wickson, John Wiley & Sons, New York 1993.

VIII. Phosphites: Typical examples are triphenyl phosphite, diphenylalkyl phosphites, phenyidialkyl phosphites, tris(nonylphenyl) phosphite, trilauryl phosphite, trioctadecyl phosphite, distearylpentaerythritol diphosphite, tris(2,4-di-tert-butylphenyl) phosphite, diisodecylpentaerythritol diphosphite, bis(2,4-di-tert-butylphenyl) pentaerythritol diphosphite, bis(2,6-di-tert-butyl-4-methylphenyl)pentaerythritol diphosphite, bis-isodecyloxypentaerythritol diphosphite, bis(2,4-di-tert-butyl-6-methylphenyl)pentaerythritol diphosphite, bis(2,4,6-tritert-butylphenyl)pentaerythritol diphosphite, tristearylsorbitol triphosphite, bis-(2,4-di-tert-butyl-6-methylphenyl)methyl phosphite, bis(2,4-di-tert-butyl-6-methylphenyl)ethyl phosphite. Particularly suitable are trioctyl phosphite, tridecyl phosphite, tridodecyl phosphite, tritetradecyl phosphite, tristearyl phosphite, trioleyl phosphite, triphenyl phosphite, tricresyl phosphite, tris-p-nonylphenyl phosphite or tricyclohexyl phosphite, and particularly preferred are aryldialkyl phosphites and alkyldiaryl phosphites, such as phenyldidecyl phosphite, (2,4-di-tert-butylphenyl)-di-dodecyl phosphite, (2,6-di-tert-butylphenyl)-di-dodecyl phosphite and dialkyl- and diarylpentaerythritol diphosphites, such as distearylpentaerythritol diphosphite, and also non-stoichiometric triaryl phosphites. e.g. of the composition $(H_{19}C_9C_6H_4O)_{1.5}P(OC_{12,13}H_{25,27})_{1.5}$. Preferred organic phosphites are distearylpentaerythritol diphosphite, trisnonylphenyl phosphite and phenyldidecyl phosphite. The organic phosphites can be used in an amount of typically 0.01 to 10, conveniently of 0.05 to 5 and, preferably, of 0.1 to 3, parts by weight, based on 100 parts by weight of PVC.

IX. Thiophosphites and Thiophosphates: Thiophosphites or thiophosphates are compounds of the general type: $(RS)_3P$, $(RS)_3P=O$ or $(RS)_3P=S$, such as described in the patent publications DE 28 09 492, EP 090.770 and EP 573.394. Typical examples of these compounds are: trithiohexyl phosphite, trithiooctyl phosphite, trithiolauryl phosphite, trithiobenzyl phosphite, methyl tris(carbo-i-octyloxy) trithiophosphite, methyl tris(carbo-trimethylcyclohexyloxy) trithiophosphite, methyl-S,S,S-tris(carbo-i-octyloxy) trithiophosphate, methyl-S,S,S-tris(carbo-2-ethylhexyloxy) trithiophosphate, ethyl-S,S,S-tris-1-(carbohexyloxy)trithiophosphate, ethyl-S,S,S-tris-1-(carbo-2-ethylhexyloxy) trithiophosphate, ethyl-S,S,S-tris-2-(carbo-2-ethylhexyloxy) trithiophosphate.

X. Mercaptocarboxylate: Typical examples of these compounds are: esters of thioglycolic acid, thiomalic acid, mercaptopropionic acid, of mercaptobenzoic acids or of thiolactic acid, such as are described in patents FR 2 459 816, EP 90.748, FR 2 552 440, EP 365.483. Said mercaptocarboxylates also include polyol esters or their partial esters.

XI. Epoxidised fatty acid ester: The novel stabliser combination can additionally contain at least one epoxidised fatty acid ester. Suitable esters are, in particular, esters of fatty acids of natural sources (fatty acid glycerides), such as soy bean oil or rape seed oil. However, synthetic products can also be used, such as epoxidised butyl oleate.

XII. Antioxidants: Suitable antioxidants are:

1. Alkylated monophenols, for example 2,6-di-tert-butyl-4-methylphenol, 2-tert-butyl-4,6-di-methylphenol, 2,6-di-tert-butyl-4-ethylphenol, 2,6-di-tert-butyl-4-n-butylphenol, 2,6-di-tert-butyl-4-isobutylphenol, 2,6-dicyclopentyl-4-methylphenol, 2-(a-methylcyclohexyl)-4,6-dimethylphenol, 2,6-dioctadecyl-4-methylphenol, 2,4,6-tricyclohexylphenol, 2,6-di-tert-butyl-4-methoxymethylphenol, 2,6-di-nonyl-4-methylphenol, 2,4-dimethyl-6-(1'-methylundec-1'-yl)phenol, 2,4-dimethyl-6-(1'-methylheptadec-1'-yl)phenol, 2,4-dimethyl-6-(1'-methyltridec-1'-yl)phenol, octylphenol, nonylphenol, dodecylphenol and mixtures thereof.

2. Alkylthiomethylphenols, for example 2,4-dioctylthiomethyl-6-tert-butylphenol, 2,4-dioctylthiomethyl-6-methylphenol, 2,4-dioctylthiomethyl-6-ethylphenol, 2,6-di-dodecylthiomethyl-4-nonylphenol.

3. Alkylated hydrocquinones, for example 2,6-di-tert-butyl-4-methoxyphenol, 2,5-di-tert-butylhydroquinone, 2,5-di-tert-amylhydroquinone, 2,6-diphenyl-4-octadecyloxyphenol, 2,6-di-tert-butylhydroquinone, 2,5-di-tert-butyl-4-hydroxyanisole, 3,5-di-tert-butyl-4-hydroxyanisole, 3,5-di-tert-butyl-4-hydroxyphenyl stearate, bis-(3,5-di-tert-butyl-4-hydroxyphenyl) adipate.

4. Hydroxylated thiodiphenyl ethers, for example 2,2'-thiobis(6-tert-butyl-4-methylphenol), 2,2'-thiobis(4-octylphenol), 4,4'-thiobis(6-tert-butyl-3-methylphenol), 4,4'-thiobis(6-tert-butyl-2-methylphenol), 4,4'-thiobis-(3,6-di-sec-amylphenol), 4,4'-bis(2,6-dimethyl-4-hydroxyphenyl)disulfide.

5. Alkylidenebisphenols, for example 2,2'-methylenebis (6-tert-butyl-4-methylphenol), 2,2'-methylenebis(6-tert-butyl-4-ethylphenol), 2,2'-methylenebis[4-methyl-6-(α-methylcyclohexyl)-phenol], 2,2'-methylenebis(4-methyl-6-cyclohexylphenol), 2,2'-methylenebis(6-nonyl-4-methylphenol), 2,2'-methylenebis(4,6-di-tert-butylphenol), 2,2'-ethylidenebis(4,6-di-tert-butylphenol), 2,2'-ethylidenebis(6-tert-butyl-4-isobutylphenol), 2,2'-methylenebis[6-(α-methylbenzyl)-4-nonylphenol], 2,2'-methylenebis[6-(α,α-dimethylbenzyl)-4-nonylphenol], 4,4'-methylenebis(2,6-di-tert-butylphenol), 4,4'-methylenebis(6-tert-butyl-2-methylphenol), 1,1-bis(5- tert-butyl-4-hydroxy-2-methylphenyl)butane, 2,6-bis (3-tert-butyl-5-methyl-2-hydroxybenzyl)-4-methylphenol, 1,1,3-tris(5-tert-butyl-4-hydroxy-2-methylphenyl)butane, 1,1-bis(5-tert-butyl-4-hydroxy-2-methyl-phenyl)-3-n-dodecylmercaptobutane, ethylene glycol bis[3,3-bis(3'-tert-butyl-4'-hydroxyphenyl)butyrate], bis(3-tert-butyl-4-hydroxy-5-methyl-phenyl)dicyclopentadiene, bis[2-(3'-tert-butyl-2'-hydroxy-5'-methylbenzyl)-6-tert-butyl-4-methylphenyl]terephthalate, 1,1-bis(3,5-dimethyl-2-hydroxyphenyl)butane, 2,2-bis-(3,5-di-tert-butyl-4-hydroxyphenyl)propane, 2,2-bis(5-tert-butyl-4-hydroxy2-methylphenyl)-4-n-dodecylmercaptobutane, 1,1,5,5-tetra(5-tert-butyl-4-hydroxy-2-methylphenyl) pentane.

6. Benzyl compounds, for example 3,5,3',5'-tetra-tert-butyl-4,4'-dihydroxydibenzyl ether, octadecyl-4-hydroxy-3,5-dimethylbenzylmercaptoacetate, tridecyl-4-hydroxy-3,5-di-tert-butylbenzylmercaptoacetate, tris (3,5-di-tert-butyl-4-hydroxybenzyl)amine, bis(4-tert-butyl-3-hydroxy-2,6-dimethylbenzyl) dithioterephthalate, bis(3,5-di-tert-butyl-4-hydroxybenzyl)sulfide, isooctyl-3,5-di-tert-butyl-4-hydroxybenzylmercaptoacetate.

7. Hydroxybenzylated malonates, for example dioctadecyl-2,2-bis-(3,5-di-tert-butyl-2-hydroxybenzyl)-malonate, di-octadecyl-2-(3-tert-butyl-4-hydroxy-5-methylbenzyl)-malonate, di-dodecylmercaptoethyl-2,2-bis-(3,5-di-tert-butyl-4-hydroxybenzyl)malonate, bis[4-(1,1,3,3-tetramethylbutyl)phenyl]-2,2-bis(3,5-di-tert-butyl-4-hydroxybenzyl)malonate.

8. Aromatic hydroxybenzyl compounds, for example 1,3, 5-tris-(3,5-di-tert-butyl-4-hydroxy-benzyl)-2,4,6-trimethylbenzene, 1,4-bis(3,5-di-tert-butyl-4-hydroxybenzyl)-2,3,5,6-tetramethylbenzene, 2,4,6-tris (3,5-di-tert-butyl-4-hydroxybenzyl)phenol.

9. Triazine compounds, for example 2,4-bis (octylmercapto)-6-(3,5-di-tert-butyl-4-hydroxyanilino) -1,3,5-triazine, 2-octylmercapto-4,6-bis(3,5-di-tert-butyl-4-hydroxyanilino)-1,3,5-triazine, 2-octylmercapto-4,6-bis(3,5-di-tert-butyl-4-hydroxyphenoxy)-1,3,5-triazine, 2,4,6-tris-(3,5-di-tert-butyl-4-hydroxyphenoxy)-1,2,3-triazine, 1,3,5-tris-(3, 5-di-tert-butyl-4-hydroxybenzyl)isocyanurate, 1,3,5-tris(4-tert-butyl-3-hydroxy-2,6-dimethylbenzyl) isocyanurate, 2,4,6-tris(3,5-di-tert-butyl-4-hydroxyphenylethyl)-1,3,5-triazine, 1,3,5-tris(3,5-di-tert-butyl-4-hydroxyphenylpropionyl)-hexahydro-1,3, 5-triazine, 1,3,5-tris(3,5-dicyclohexyl-4-hydroxybenzyl)isocyanurate.

10. Phosphonates and phosphonites, for example dimethyl-2,5-di-tert-butyl-4-hydroxybenzylphosphonate, diethyl-3,5-di-tert-butyl-4-hydroxybenzylphosphonate, dioctadecyl-3,5-di-tert-butyl-4-hydroxybenzylphosphonate, dioctadecyl-5-tert-butyl-4-hydroxy-3-methylbenzylphosphonate, the calcium salt of the monoethyl ester of 3,5-di-tert-butyl-4-hydroxy-benzylphosphonic acid, tetrakis(2,4-di-tert-butylphenyl)-4,4'-biphenylenediphosphonite, 6-isooctyloxy-2,4,8,10-tetra-tert-butyl-1 2H-dibenz[d, g]-1 ,3,2-dioxaphosphocin, 6-fluoro-2,4,8,10-tetra-tert-butyl-12-methyl-dibenz[d,g]-1 ,3,2-dioxaphosphocin.

11. Acylaminophenols, for example 4-hydroxylauranilide, 4-hydroxystearanilide, octyl N-(3,5-di-tert-butyl-4-hydroxyphenyl)carbamate.

12. Esters of β-(3,5-di-tert-butyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis (hydroxyethyl)-oxamide, 3-thiaundecanol, 3-thiapentadecanol, trimethylhexanediol, trimethylolpropane, 4-hydroxymethyl-1-phospha-2,6, 7-trioxabicyclo[2.2.2]octane.

13. Esters of β-(5-tert-butyl-4-hydroxy-3-methylphenyl) propionic acid with mono- or poly-hydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl) isocyanurate, N,N'-bis (hydroxyethyl)oxamide, 3-thiaundecanol, 3-thiapentadecanol, trimethylhexanediol, trimethylolpropane, 4-hydroxymethyl-1 -phospha-2,6, 7-trioxabicyclo[2.2.2]octane.

14. Esters of β-(3,5-dicyclohexyl-4-hydroxyphenyl) propionic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thiaundecanol, 3-thiapentadecanol, trimethylhexanediol, trimethylolpropane, 4-hydroxymethyl-1-phospha-2,6, 7-trioxabicyclo[2.2.2]octane.

15. Esters of 3.5-di-tert-butyl-4-hydroxyphenyl acetic acid with mono- or polyhydric alcohols, e.g. with methanol, ethanol, octanol, octadecanol, 1,6-hexanediol, 1,9-nonanediol, ethylene glycol, 1,2-propanediol, neopentyl glycol, thiodiethylene glycol, diethylene glycol, triethylene glycol, pentaerythritol, tris(hydroxyethyl)isocyanurate, N,N'-bis (hydroxyethyl)oxamide, 3-thia-undecanol, 3-thiapentadecanol, trimethylhexanediol, trimethylolpropane, 4-hydroxymethyl-1-phospha-2,6, 7-trioxabicyclo[2.2.2]octane.

16. Amides of β-(3.5-di-tert-butyl-4-hydroxyphenyl) propionic acid e.g. N,N'-bis(3,5-di-tert-butyl-4-hydroxyphenylpropionyl)hexamethylenediamide, N,N'-bis(3,5-di-tert-butyl-4-hydroxyphenylpropionyl) trimethylenediamide, N,N'-bis(3,5-di-tert-butyl-4-hydroxyphenylpropionyl)-hydrazide.

17. Vitamin D (tocopherol) and derivatives

Preferred antioxidants are those of the groups 1–5, 10 and 12, in particular 2,2-bis(4-hydroxyphenyl)propane, 3,5-di-tert-butyl-4-hydroxyphenylpropionate with octanol, octadecanol or pentaerythritol or tris(2,4-di-tert-butylphenyl) phosphite.

A mixture of antioxidants of different structure may also be used, where appropriate.

The antioxidants can be used in an amount of typically 0.01 to 10, conveniently of 0.1 to 10 and, preferably, of 0.1 to 5, parts by weight, based on 100 parts by weight of PVC.

XIII. UV absorbers and light stabilisers: Illustrative examples thereof are:

1. 2-(2'-Hydroxyphenyl)benzotriazoles, for example 2-(2'-hydroxy-5'-methylphenyl)-benzotriazole, 2-(3',5'-di-tert-butyl-2'-hydroxyphenyl)benzotriazole, 2-(5'- tert-butyl-2'-hydroxy-phenyl)benzotriazole, 2-(2'-hydroxy-5'-(1,1,3,3-tetramethylbutyl)phenyl) benzotriazole, 2-(3',5'-di-tert-butyl-2'-hydroxyphenyl)-5-chloro-benzotriazole, 2-(3'-tert-butyl-2'-hydroxy-5'-methylphenyl)-5-chloro-benzotriazole, 2-(3'-sec-butyl-5'-tert-butyl-2'-hydroxyphenyl)benzotriazole, 2-(2'-hydroxy-4'-octyloxyphenyl)benzotriazole, 2-(3',5'-di-tert-amyl-2'-hydroxy-phenyl)benzotriazole, 2-(3',5'-bis(α,α-dimethylbenzyl)-2'-hydroxyphenyl) benzotriazole, mixture of 2-(3'-tert-butyl-2'-hydroxy-5'-(2-octyloxycarbonylethyl)phenyl)-5-chloro-benzotriazole, 2-(3'-tert-butyl-5'-[2-(2-ethylhexyloxy)-carbonylethyl]-2'-hydroxyphenyl)-5-chloro-benzotriazole, 2-(3'-tert-butyl-2'-hydroxy-5'-(2-methoxycarbonylethyl)phenyl)-5-chloro-benzotriazole, 2-(3'-tert-butyl-2'-hydroxy-5'-(2-methoxycarbonylethyl)phenyl)benzotriazole, 2-(3'-tert-butyl-2'-hydroxy-5'-(2-octyloxycarbonylethyl) phenyl)benzotriazole, 2-(3'-tert-butyl-5'-[2-(2-ethylhexyloxy)carbonylethyl]-2'-hydroxyphenyl) benzotriazole, 2-(3'-dodecyl-2'-hydroxy-5'-methyl-phenyl)benzotriazole, and 2-(3'-tert-butyl-2'-hydroxy-5'-(2-isooctyloxycarbonylethyl)phenyl-benzotriazole, 2,2'-methylene-bis[4-(1,1,3,3-tetramethylbutyl)-6-benzotriazole-2-ylphenol]; the transesterification product of 2-[3'-tert-butyl-5'-(2-methoxycarbonylethyl)-2'-hydroxyphenyl]-2H-benzotriazole with polyethylene glycol 300;

where R=3'-tert-butyl-4'-hydroxy-5'-2H-benzotriazol-2-ylphenyl.

2. 2-Hydroxybenzophenones, for example the 4-hydroxy, 4-methoxy, 4-octyloxy, 4-decyl-oxy, 4-dodecyloxy, 4-benzyloxy, 4,2',4'-trihydroxy and 2'-hydroxy-4,4'-dimethoxy derivatives.

3. Esters of substituted and unsubstituted benzoic acids, as for example 4-tert-butyl-phenyl salicylate, phenyl salicylate, octylphenyl salicylate, dibenzoyl resorcinol, bis(4-tert-butylbenzoyl) resorcinol, benzoyl resorcinol, 2,4-di-tert-butylphenyl 3,5-di-tert-butyl-4-hydroxybenzoate, hexadecyl 3,5-di-tert-butyl-4-hydroxybenzoate, octadecyl 3,5-di-tert-butyl-4-hydroxy-benzoate, 2-methyl-4,6-di-tert-butylphenyl 3,5-di-tert-butyl-4-hydroxybenzoate.

4. Acrylates, for example ethyl α-cyano-β,β-diphenylacrylate, isooctyl α-cyano-β,β-diphenyl-acrylate, methyl α-carbomethoxycinnamate, methyl α-cyano-p-methyl-p-methoxycinnamate, butyl α-cyano-β-methyl-p-methoxy-cinnamate, methyl α-carbomethoxy-p-methoxycinnamate and N-(β-carbomethoxy-β-cyanovinyl)-2-methylindoline.

5. Nickel compounds, for example nickel complexes of 2,2'-thio-bis-[4-(1,1,3,3-tetramethyl-butyl)phenol], such as the 1:1 or 1:2 complex, with or without additional ligands such as n-butylamine, triethanolamine or N-cyclohexyldiethanolamine, nickel dibutyidithiocarbamate, nickel salts of the monoalkyl esters, e.g. the methyl or ethyl ester, of 4-hydroxy-3,5-di-tert-butylbenzylphosphonic acid, nickel complexes of ketoximes, e.g. of 2-hydroxy-4-methylphenyl undecylketoxime, nickel complexes of 1-phenyl-4-lauroyl-5-hydroxypyrazole, with or without additional ligands.

6. Oxamides, for example 4,4'-dioctyloxyoxanilide, 2,2'-diethoxyoxanilide, 2,2'-dioctyloxy-5,5'-di-tert-butoxanilide, 2,2'-didodecyloxy-5,5'-di-tert-butoxanilide, 2-ethoxy-2'-ethyloxanilide, N,N'-bis(3-dimethylaminopropyl)oxamide, 2-ethoxy-5-tert-butyl-2'-ethoxanilide and its mixture with 2-ethoxy-2'-ethyl-5,4'-di-tert-butoxanilide, mixtures of o- and p-methoxy-disubstituted oxanilides and mixtures of o- and p-ethoxy-disubstituted oxanilides.

7. 2-(2-Hydroxyphenyl)-1,3,5-triazines, for example 2,4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine, 2-(2-hydroxy-4-octyloxyphenyl)-4,6-bis-(4-methylphenyl)-1,3,5-triazine, 2-(2-hydroxy-4-dodecyloxyphenyl)-4,6-bis(2,4-dimethylphenyl)-1,3,5-triazine, 2-(2-hydroxy-4-tridecyloxyphenyl)-4,6-bis(2,4-dimethylphenyl)-1,3,5-triazine, 2-[2-hydroxy-4-(2-hydroxy-3-butyloxy-propoxy)phenyl]-4,6-bis(2,4-dimethyl)-1,3,5-triazine, 2-[2-hydroxy-4-(2-hydroxy-3-octyloxy-propyloxy) phenyl]-4,6-bis(2,4-dimethyl)-1,3,5-triazine, 2-[4-(dodecyloxyltridecyloxy-2-hydroxypropoxy)-2-hydroxy-phenyl]-4,6-bis(2,4-di-methylphenyl)-1,3,5-triazine.

XIV. Blowing agents: Blowing agents are, for example, organic azo and hydrazo compounds, tetrazoles, oxazines, isatoic acid anhydride, as well as soda and sodium hydrogencarbonate. Azodicarbonamide and sodium hydrogencarbonate, and the mixtures thereof, are preferred.

Definitions and examples of impact modifiers and processing auxiliaries, gelling agents, antistatic agents, biocides, metal deactivators, fluorescent whitening agents, flame retardants and antifogging agents are described in "Kunststoffadditive", R. Gächter/H. Müller, Carl Hanser Verlag, 3rd Ed., 1989, and in "Handbook of Polyvinyl Chloride Formulating" E J. Wilson, J. Wiley & Sons, 1993. Impact modifiers are also described in detail in "Impact Modifiers for PVC", J. T. Lutz/D. L. Dunkelberger, John Wiley & Sons, 1992.

Typical examples of the rigid PVC materials to be stabilised are: polymers of vinyl chloride, vinyl resins containing vinyl chloride units in their structure, such as copolymers of vinyl chloride and vinyl esters of aliphatic acids, preferably vinyl acetate, copolymers of vinyl chloride with esters of acrylic acid and methacrylic acid and with acrylonitrile, copolymers of vinyl chloride with diene compounds and unsaturated dicarboxylic acids or their anhydrides, such as copolymers of vinyl chloride with diethyl maleate, diethyl fumarate or maleic acid anhydride, postchlorinated polymers and copolymers of vinyl chloride, copolymers of vinyl chloride and vinylidene chloride with unsaturated aldehydes, ketones and others, such as acrolein, crotonaldehyde, vinyl methyl ketone, vinyl methyl ether, vinyl isobutyl ether and the like; polymers of vinylidene chloride and copolymers thereof with vinyl chloride and other polymerisable compounds; polymers of vinyl chloroacetate and dichlorodivinyl ether; chlorinated polymers of vinyl acetate, chlorinated polymeric esters of acrylic acid and of alpha-substituted acrylic acid; polymers of chlorinated styrenes, for example dichlorostyrene; chlorinated rubbers; chlorinated polymers of ethylene; polymers and postchlorinated polymers of chlorobutadiene and their copolymers with vinyl chloride, rubber hydrochloride and chlorinated rubber hydrochloride; as well as mixtures of the cited polymers with one another or with other polymerisable compounds.

These materials also include graft polymers of PVC with EVA, ABS and MBS. Preferred substrates are also mixtures of the above homo-and copolymers, preferably vinyl chloride homopolymers, with other thermoplastic or/and elastomeric polymers, in particular blends with ABS, MBS, NBR, SAN, EVA, CPE, MBAS, PMA, PMMA, EPDM and polylactones.

Illustrative examples of such components A are compositions consisting of (i) 20–80 parts by weight of a vinyl chloride homopolymer (PVC) and (ii) 80-20 parts by weight of at least one thermoplastic copolymer based on styrene and acrylonitrile, preferably of the ABS, NBR, NAR, SAN and EVA group. The abbreviations used for the copolymers are familiar to the skilled person and signify: ABS: acrylonitrile/butadiene/styrene; SAN: styrene/acrylonitrile; NBR: acrylonitrile/butadiene; NAR: acrylonitrile/acrylate; EVA: ethylene/vinyl acetate. Also suitable are, in particular, styrene/acrylonitrile copolymers based on acrylate (ASA). In this connection, components A are preferably polymer compositions which comprise as components (i) and (ii) a mixture of 25–75% by weight of PVC and 75-25% by weight of the cited copolymers. Typical examples of such compositions are: 25–50% by weight of PVC and 75–50% by weigth of copolymers, or 40–75% by weight of PVC and 60–25% by weight of copolymers. Preferred copolymers are ABS, SAN and modified EVA, preferably ABS. NBR, NAR and EVA are also particularly suitable. One or several of the cited copolymers may be present in the novel compositions. Particularly important components A are compositions comprising (i) 100 parts by weight of PVC, and (ii) 0–300 parts by weight of ABS and/or SAN-modified ABS and 0–80 parts by weight of the copolymers NBR, NAR and/or EVA, preferably EVA.

Other suitable compounds to be used for stabilising within the scope of this invention are preferably also recyclates of chlorine-containing polymers, which are the polymers described above in more detail and which have suffered damage through processing, use or storage. PVC recyclate is particularly preferred. The recyclates may also contain minor amounts of foreign material, such as paper, pigments and adhesives, which are often difficult to remove. These foreign materials can also originate from contact with diverse substances during use or processing, such as fuel residues, paint components, metal traces and initiator residues.

The novel stabilisation is particularly advantageous in the case of PVC formulations customarily used for pipes. Stabilising can be carried out without any heavy metal compounds (Sn, Pb, Zn stabilisers). This property is advantageous in certain areas because heavy metals—with the possible exception of zinc—are for ecological reasons often undesirable in production and also in the application of certain PVC articles. This invention also relates to a process for stabilising rigid or semi-rigid PVC, which comprises adding thereto at least one compound of formula I in the absence of compounds of the groups of perchlorate compounds, glycidyl compounds, beta-diketones, beta-keto esters, dihydropyridines, polydihydropyridines, polyols, disaccharide alcohols, sterically hindered amines (tetraalkylpiperidine compounds), alkali alumosilicates (zeolites), hydrotalcites, alkali alumocarbonates (dawsonites).

The incorporation of the stabilisers may conveniently be effected by the following methods:
- as emulsion or dispersion (One possible form is that of a pasty mixture. In the case of this form of presentation, one advantage of the novel combination consists in the stability of the paste.);
- as dry mixture during the blending of the additive components or polymer mixtures;
- by direct addition to the processing apparatus (e.g. calender, mixer, kneader, extruder and the like), or
- as solution or melt.

The PVC stabilised according to this invention, which is also an object of this invention, can be prepared in a manner known per se by mixing the novel stabiliser combination and optional further additives with the PVC using per se known appliances such as the above processing apparatus. The stabilisers may be added singly or in mixture or also in the form of a masterbatch.

The PVC stabilised according to this invention can be brought into the desired shape by known methods. Such methods are, for example, grinding, calendering, extruding, injection moulding or spinning, and also extrusion blow moulding. The stabilised PVC can also be processed to foams.

The rigid PVC stabilised according to this invention is particularly suitable for e.g. hollow articles (bottles), packaging films (thermoforming films), blown films, pipes, foams, heavy profiles (window frames), light wall profiles, building profiles, sidings, fittings, office films and and apparatus housings (computer, household appliances). PVC rigid foam moulded articles and PVC pipes are preferred, such as for drinking water or waste water, pressure pipes, gas pipes, cable channel tubes and cable sheath tubes, pipes for industrial lines, drain pipes, soil pipes, gutter pipes and drainage pipes. Further detail are to be found in "Kunststoffhandbuch PVC", Vol. 212, W. Becker/H. Braun, 2nd Ed., 1985, Carl Hanser Verlag, pages 1236–1277.

The compounds of formula I are prepared by known methods, as illustrated in more detail in the following Examples. There, as well as is the remaining text, parts and percentages are by weight, unless otherwise indicated.

Example 1. Preparation of 6-amino-1,3-dimethyluracil

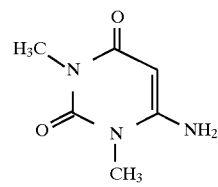
(Ex. 1)

224.8 g of N,N'-dimethylurea
238.7 g of cyanoacetic acid and
310. 9 g of acetic acid anhydride are heated, with stirring, to 80° C. under nitrogen. This mixture is stirred for 2 h at 80° C. and is evacuated to 50 mbar such that the acetic acid distills off. After cooling this mixture to 35° C., 250 g of ice water are added. This mixture is stirred for 10 min and then 567 g of 15% sodium hydroxide solution are added dropwise while cooling with ice. Up to 475 ml the pH does not rise above 7. When pH 7 is exceeded, the precipitate changes and the mixture warms from 23 to about 50° C., the pH then being 10.2. After adding 200 g of water, the mixture is stirred for 10 minutes and heated under reflux. After refluxing for one hour, the mixture is cooled to 20° C. and subjected to suction filtration. The filter cake is washed with 2×100 g of cold water and then dried at 90° C. in a vacuum drying oven.

Yield: 334 g (86.1% of theory), m.p.: 282°C.

Example 2: Preparation of 6-phenylamino-1,3-dimethyluracil (Ex. 2)

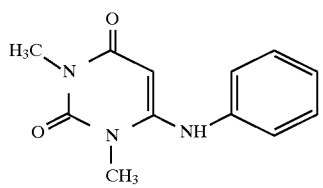

A mixture of 39.1 g of aniline and 24.5 g of 1,3-dimethylbarbituric acid chloride is refluxed, with stirring, in a 100 ml three-necked apparatus at 190° C. for 15 min. This mixture is cooled to room temperature and then 300 ml of water are added. With stirring, a pale blue precipitate forms which is then collected by suction, washed with ether and then dried to constant weight.

Recrystallisation from methylene chloride/activated carbon gives a colourless product which is then dried.

Yield: 22.5 g (69.5% of theory), m.p. 190° C.

Example 3: Static heat test

A dry mixture consisting of the ingredients cited in the following production parameters is rolled in a mixer roller for 5 min at 180° C. 0.3 mm test pieces of the film are taken from the rolled sheet so obtained. The film samples are subjected to thermal stress in an oven at 180° C. The yellowness index (YI) is determined at intervals of 5 or 10 min according to ASTM D-1925-70. The results are given in the following Tables. Low YI values signify good stabilisation.

|  | Mixture I | Mixture II |
| --- | --- | --- |
| S-PVC (K value 64) | 100 | 100 |
| epoxidised soy bean oil | 2 | 2 |
| compound Ex. 1 | — | 0.4 |

| STRESS DURATION [min] | 0 | 10 | 20 | 30 | 40 | 50 | 60 |
| --- | --- | --- | --- | --- | --- | --- | --- |
| YI(MIXTURE I) | 24.9 | 86.9 | >100 | | | | |
| YI(MIXTURE II) | 3.1 | 9.4 | 18.0 | 27.4 | 44.0 | 73.5 | >100 |

|  | Mixture III |
| --- | --- |
| S-PVC (K value 64) | 100 |
| calcium stearate | 0.35 |
| zinc stearate | 0.15 |
| epoxidised soy bean oil | 4 |
| wax 368 (ester wax) | 0.6 |
| partially oxidised polyethylene wax | 0.1 |
| processing auxiliary based on acrylate | 0.5 |
| impact modifier | 8 |
| compound Ex. 1 | 0.6 |

| STRESS DURATION (min) | 0 | 10 | 20 | 30 | 40 | 50 |
| --- | --- | --- | --- | --- | --- | --- |
| YI(MIXTURE III) | 9.3 | 11.0 | 17.9 | 26.0 | 37.1 | 59.8 |

|  | Mixture IV | Mixture V |
| --- | --- | --- |
| S-PVC (K value 64) | 100 | 100 |
| epoxidised soy bean oil | 2 | 2 |
| compound Ex. 2 | — | 0.6 |

| STRESS DURATION [min] | 0 | 10 | 20 |
| --- | --- | --- | --- |
| YI(MIXTURE IV) | 13.1 | 73.6 | >100 |
| YI(MIXTURE V) | 4.2 | 18.9 | 53.7 |

|  | Mixture VI |
| --- | --- |
| S-PVC (K value 64) | 100 |
| calcium stearate | 0.35 |
| zinc stearate | 0.15 |
| epoxidised soy bean oil | 4 |
| wax 368 (ester wax) | 0.6 |
| partially oxidised polyethylene wax | 0.1 |
| processing auxiliary based on acrylate | 0.5 |
| impact modifier | 8 |
| compound Ex. 2 | 0.6 |

| STRESS DURATION (min) | 0 | 10 | 20 | 30 | 40 | 50 |
| --- | --- | --- | --- | --- | --- | --- |
| YI(MIXTURE VI) | 7.3 | 11.9 | 22.1 | 62.4 | 87.0 | >100 |

|  | Mixture VII |
| --- | --- |
| S-PVC (K value 64) | 100 |
| epoxidised soy bean oil | 3 |
| calcium stearate | 0.35 |
| zinc stearate | 0.15 |
| compound Ex. 1 | 0.3 |

| STRESS DURATION (min) | 0 | 10 | 20 | 30 | 40 | 50 |
| --- | --- | --- | --- | --- | --- | --- |
| YI(MIXTURE VII) | 5.2 | 7.1 | 8.4 | 15.8 | 34.5 | 60.4 |

|  | Mixture VIII | Mixture IX |
| --- | --- | --- |
| S-PVC (K value 64) | 100 | 100 |
| epoxidised soy bean oil | 2 | 2 |
| compound Ex. 1 | — | 0.4 |

| STRESS DURATION (min) | 0 | 10 | 20 | 30 | 40 | 50 | 60 |
| --- | --- | --- | --- | --- | --- | --- | --- |
| YI(MIXTURE VIII) | 48.6 | 115 | 173.9 | | | | |
| YI(MIXTURE XI) | 7.0 | 13.4 | 24.1 | 32.3 | 52.5 | 79.4 | >100 |

What is claimed is:

1. A composition, comprising

A) rigid or semi-rigid PVC having a plasticiser content of up to 20%, and

B) at least one compound of formula 1,

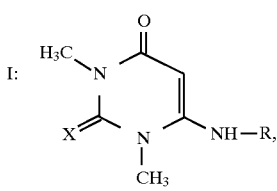

wherein X is O or S, and R is H or phenyl, with the proviso that compounds from the groups of the perchlorate compounds, glycidyl compounds, beta-diketones, beta-keto esters, dihydropyridines, polydihydropyridines, polyols, disaccharide alcohols, sterically hindered amines (tetraalkylpiperidine compounds), alkali alumosilicates (zeolites), hydrotalcites, alkali alumocarbonates (dawsonites) are not present.

2. A composition according to claim 1, wherein A) is rigid PVC having a plasticiser content of up to 10%.

3. A composition according to claim 1, wherein A) is rigid PVC having a plasticiser content of up to 5%.

4. A composition according to claim 1, wherein A) is rigid PVC without any plasticiser.

5. A composition according to claim 1, wherein B) is a compound of formula 1, where X=O.

6. A composition according to claim 5, wherein B) is the compound

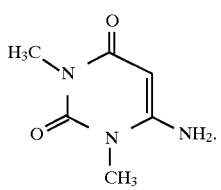

7. A composition according to claim 1, which is essentially free of heavy metal.

8. A composition according to claim 1, which additionally comprises a phosphite.

9. A process for stabilising rigid or semi-rigid PVC having a plasticiser content of up to 20%, which comprises incorporating into the PVC at least one compound of formula I as defined in claim 1 in the absence of compounds of the groups of perchlorate compounds, glycidyl compounds, beta-diketones, beta-keto esters, dihydropyridines, polydihydro- pyridines, polyols, disaccharide alcohols, sterically hindered amines (tetraalkylpiperidine compounds), alkali alumosilicates (zeolites), hydrotalcites, alkali alumocarbonates (dawsonites).

10. The process according to claim 9, wherein the rigid or semi-rigid PVC is in the form of a pipe.

* * * * *

UNITED STATES PATENT AND TRADEMARK OFFICE
CERTIFICATE OF CORRECTION

PATENT NO. : 5,859,100
DATED : January 12, 1999
INVENTOR(S) : Wolfgang Wehner, et al.

It is certified that error appears in the above-identified patent and that said Letters Patent is hereby corrected as shown below:

Column 7,
Line 15: "tetrα" should read --tetra--
Line 61: "tetrα" should read --tetra--
Line 61: "1 2H" should read -- 12H--
Line 62: "tetr" should read -- tetra- Column 9
Line 59: "dibutyidithiocarbamate" should read --dibutyldithiocarbamate--

Column 11,
Line 52: "This" should begin a new paragraph.

Column 12,
Line 25: "PVC" should begin a new paragraph.

Column 16,
Line 6, Claim 9: Both instances of "bet " should be --beta--
Line 7, Claim 9: "polydihydro- pyridines should read --polydihydropyridines--

Signed and Sealed this

Twenty-fourth Day of July, 2001

*Nicholas P. Godici*

Attest:

NICHOLAS P. GODICI
*Acting Director of the United States Patent and Trademark Office*

*Attesting Officer*